United States Patent

Fukasawa et al.

[11] 3,887,958
[45] June 10, 1975

[54] HEADLIGHT WIPER MECHANISM FOR A MOTOR VEHICLE

[75] Inventors: Noburu Fukasawa, Kamakura; Takanori Kitagawa, Yokosuka; Naohiko Inoue, Yokohama, all of Japan

[73] Assignee: Nissan Motor Company Limited, Yokohama, Japan

[22] Filed: June 18, 1973

[21] Appl. No.: 370,605

[30] Foreign Application Priority Data
July 22, 1972 Japan................................ 47-86533

[52] U.S. Cl. ......... 15/250.17; 15/250.22; 15/250 A
[51] Int. Cl. ............................................. B60s 1/44
[58] Field of Search......... 15/250.22, 250.17, 250.3, 15/250 A, 250.2, 250.16

[56] References Cited
UNITED STATES PATENTS

| | | | |
|---|---|---|---|
| 2,156,505 | 5/1939 | Marcolivio | 15/250.20 |
| 3,641,613 | 2/1972 | Povilaitis et al. | 15/250 A |
| 3,648,323 | 3/1972 | Le Blanc, Sr. | 15/250.22 |
| 3,649,990 | 3/1972 | Saito | 15/250.22 |
| 3,667,082 | 6/1972 | Hoyler | 15/250 A |

FOREIGN PATENTS OR APPLICATIONS

| | | | |
|---|---|---|---|
| 676,967 | 12/1963 | Canada | 15/250 A |

Primary Examiner—Peter Feldman

[57] ABSTRACT

A mechanism for wiping a pair of headlights comprising a rotating wiper arm and blade assembly for each headlight, and means to park the wiper arm and blade assemblies outside of the surfaces of the headlights when not in use.

1 Claim, 3 Drawing Figures

HEADLIGHT WIPER MECHANISM FOR A MOTOR VEHICLE

The present invention generally relates to a wiper mechanism, and particularly to a headlight wiper mechanism for a motor vehicle.

Mud splashed onto and adhering to the lenses of the headlights of a motor vehicle, or rain, or snow accumulating on the lenses reduce the intensity of illumination of the headlights and scatter the beams cast by the headlights with the consequent risk of an accident.

Heretofore various proposals have been made for wiping the lenses of the headlights of motor vehicles. One prior art headlight wiper employs an oscillable wiper arm for each headlight carrying a wiper blade at its outer end portion which, due to the oscillation of the wiper arm, sweeps the lens of the headlight between inboard and outboard stroke limits. This prior art device is inadequate in that the wiper arm and blade assembly rests on the lens of the headlight even when the wiper is not in use, thereby reducing the intensity of illumination of the headlight.

Another prior art headlight wiper employs a wiper blade assembly for each headlight, rotatable about the center axis of the lens of the headlight. This prior art wiper is more advantageous than the aforementioned prior art headlight wiper in that the wiper blade is capable of sweeping a larger area of the surface of the lens of the headlight, but it is inadequate in that the wiper blade is held on the headlight even when the wiper is not in use, thereby reducing the intensity of illumination of the headlight. Moreover, since in the aforementioned prior art headlight wipers, there is found a common inadequacy in that the wiper blade does not completely sweep the convex surface of the lens of the headlight because sufficient force is not applied to urge the blade against the convex surface of the lens, thereby insufficiently removing mud, rain, or snow from the lens surface.

The present invention aims at improving the latter prior art wiper mentioned above to eliminate the inadequacies thereof.

Accordingly, one object of the present invention is to provide a headlight wiper mechanism which will not reduce the intensity of illumination of the headlight when the wiper mechanism is not in use.

Another object of the present invention resides in the provision of a wiper arm and blade assembly which imparts sufficient force on the wiper blade to force the wiper blade in contact with and to follow closely the convex surface of the lens of the headlight.

Further objects, features and advantages of the present invention will become apparent from the following description, reference being made to the accompanying drawings, wherein a preferred embodiment of the present invention is clearly shown.

Figure 1:
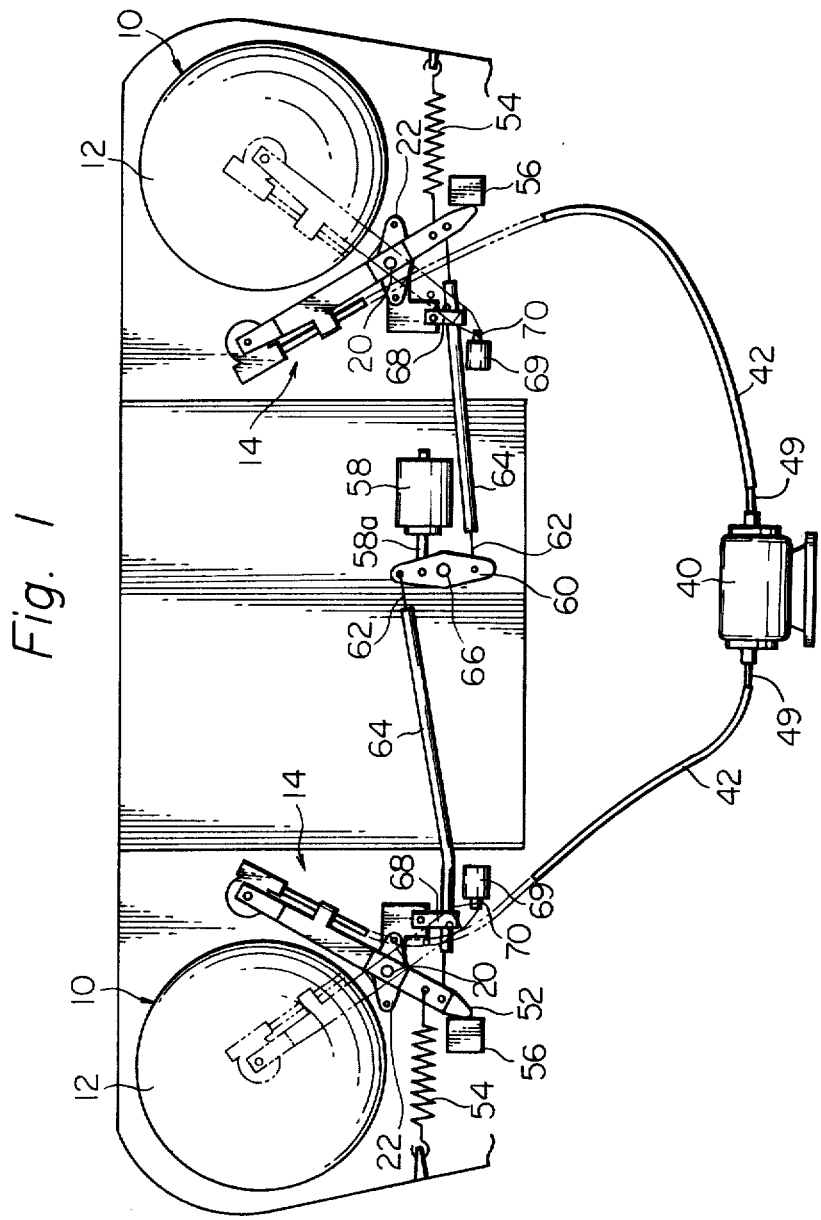
FIG. 1 is a schematic front view of a motor vehicle and a preferred embodiment of a headlight wiper mechanism of the present invention.

Referring to FIG. 1, a portion of a motor vehicle is shown having two transversely spaced headlights 10. As seen more particularly in FIGS. 2 and 3, each headlight has a convex lens 12. The headlight wiper mechanism comprises a pair (i.e., one per headlight) of wiper arms 14 having inner and outer retainers 14a and 14b which are slidably and springably connected to each other by a wiper arm spring 16, in the form of a tension spring, and carry rotatable wiper blades 18, as will be more particularly described hereinafter with reference to FIGS. 2 and 3. The wiper arms 14 are connected to pivot shafts 20 rotatably carried in brackets 22 attached to suitable portions of the vehicle radially outsides of and adjacent to the corresponding lenses 12. The wiper arm and rotatable blade assemblies are movable between operating positions (shown in broken lines) and parked positions (shown in solid) radially outside of the corresponding lenses of the headlights 10 when not in use, as will be pointed out more particularly hereinafter.

Figure 2:
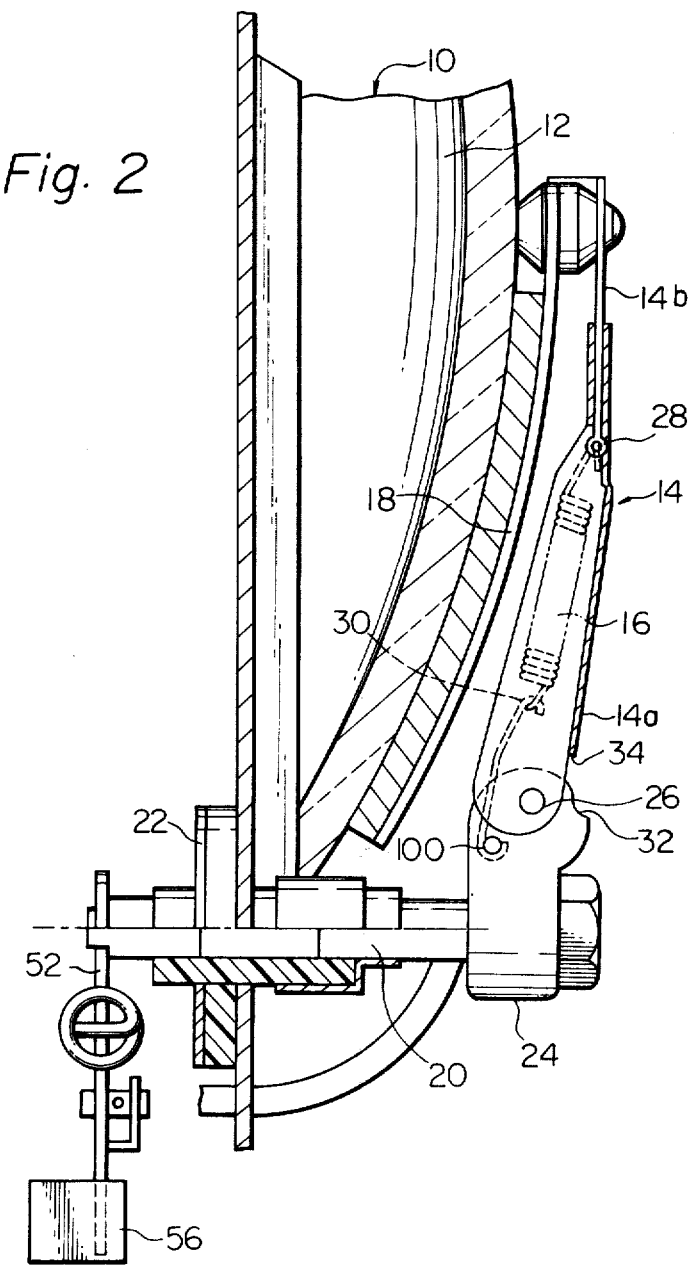
FIG. 2 is a side view, partly in section, illustrating certain important parts of the mechanism shown in FIG. 1.

As best seen in FIG. 2 each of the outer retainers 14b is slidably received in the outer end portion of the corresponding inner retainer 14a, and the inner retainer 14a is hinged to a wiper head 24 carried on the pivot shaft 20 by a hinge pin 26. The outer retainer 14b has formed at its inner end portion a curved portion 28. The outer blade carrying retainer 14b is biased towards the lens 12 by the wiper arm spring 16 having one end connected to the curved portion 28 and the other end connected to an spring retainer 30 carried on the hinge pin 100. The wiper blade 18 is thus maintained in engagement with the outer surface of the convex lens 12. There is formed on the inner end portion of the inner retainer 14a a stopper 34 in the form of a notch and on a suitable portion of the wiper head a stopper receiver 32 in the form of a projection for limiting movement in the rightward rotational direction as viewed in FIG. 2 of the inner retainer 14a about the hinger pin 26.

Figure 3:
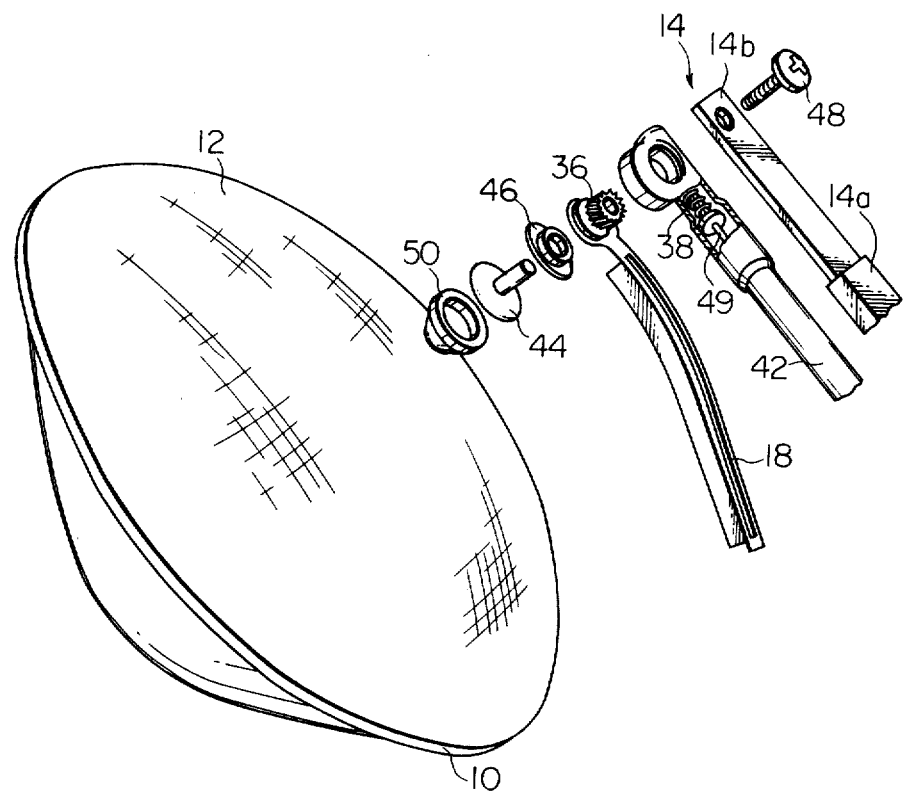
FIG. 3 is an exploded view illustrating certain important parts of the mechanism shown in FIG. 1.

As best seen in FIG. 3, each of the wiper blades 18 is provided with a worm gear 36 which is in mesh with a worm 38 rotatably connected to a wiper drive motor 40 through a flexible drive shaft 42. The wiper blade 18 is rotatably carried on the outer retainer 14b by a stud 44, washer 46 and screw 48. It is to be noted that a worm gear unit housing 49 is suitably located between the wiper blade 18 and the outer retainer 14b. In order to protect the outer surface of the lens from being damaged or scratched by the stud 44, there is provided a cover 50 formed of rubber.

Referring again to FIGS. 1 and 2, each of the pivot shafts 20 has an arm 52 attached thereto at its end. Each of the wiper arm and rotatable blade assemblies is spring biased to its parked position outside of the surface of the headlight 10 (see FIG. 1) by a springs 54. The springs 54 are connected between fixed brackets (not numbered) and the brackets 52. Fixed stoppers 56 are provided to prevent further movement of the wiper arm and rotatable blade assemblies beyond their parked positions by the springs 54.

The wiper arm and rotatable blade assemblies are movable to their operating positions on the surfaces of the headlights 10 by means of a solenoid 58 which has a core 58a operably connected to a linkage member 60, which is rotatable about a pivot shaft 66, when energized the solenoid 58 retracts its core 58a thus rotating the linkage member 60. Preferably, energization of the solenoid 58 may be made by a control switch (not shown) provided on a facia panel (not shown) of the motor vehicle. The linkage member 60 carries on its both end portions crank pins (not shown) to which respective drive links 62 are pivotably connected. The drive links 62 at their other ends are pivotably connected to the respective arms 52. The linkage members 60 and the drive links 62 are suitably supported on the vehicle in a conventional manner such attachments 68 as shown in FIG. 1. Covering tubes 64 are also provided for covering the drive links 62.

When the solenoid 58 is energized, the wiper arm and rotatable blade assemblies are moved by the pivot shaft operating linkage member 60 and the drive links 62 and arms 52 in directions opposite to the forces of the springs 54 from their parked positions to their operating positions. Fixed stoppers 69 provided with switches 70 for energizing the wiper drive motor 40 are suitably supported by the vehicle. The stoppers 69 function to prevent further movement of the respective wiper arm and rotatable blade assembly beyond their operating positions. Preferably both of the switches 70 are electrically connected in series with each other and the wiper drive motor 40 and are closed when the respective wiper arm and rotatable blade assemblies are in their operating positions. In the embodiment shown herein the switches 70 are actuated by the arms 52 attached to the pivot shafts 20. Preferably the wiper drive motor 40 comprises an electric motor coupled through a gear reduction unit (not shown) to the flexible drive shafts 42 to impart rotational movement to the wiper blades of each of the wiper arm and rotatable blade assemblies.

When the solenoid 58 is de-energized, the wiper arm and rotatable blade assemblies are moved from their operating positions, opening the respective switches 70 to stop the wiper drive motor 40, to their parked positions by the respective springs 54.

It will be appreciated from the foregoing description that a headlight wiper mechanism according to the present invention will not reduce the intensity of illumination of the headlights when the wiper mechanism is not in use, since the wiper arm and rotatable blade assemblies are disposed radially outside of the headlights at their parked positions.

It will also be appreciated that when the headlight wiper mechanism is in use, the rotatable blades are subject to effective pressure and will effectively wipe the lenses of the headlights through rotation about the respective centers of the headlights.

What is claimed is:

1. A headlight wiper mechanism for two headlights of a motor vehicle spaced transversely apart from each other of the motor vehicle, comprising two pivot shafts rotatably supported by the vehicle and disposed radially outside of said headlights; two wiper arm and rotatable blade assemblies attached to said pivot shafts, respectively for unitary rotation with said pivot shafts: operating means for moving said wiper arm and rotatable blade assemblies between operating positions whereat said wiper arm and rotatable blade assemblies are maintained in engagement with the outer surfaces of said headlights and parked positions whereat said wiper arm and rotatable blade assemblies are disposed radially outside of said headlights; and drive means automatically actuated when said wiper arm and rotatable blade assemblies are in said operating positions for imparting rotation to said rotatable blades of said wiper arm and rotatable blade assemblies, wherein the improvement being in the operating means comprises: two arms connected to said two pivot shafts and extending radially therefrom, respectively; two sets of stoppers, each set of stoppers interposing therebetween one of said two arms, providing an arrangement whereby when each of said two wiper arm and rotatable blade assemblies is in its operating position, each of said two arms engages with a first stopper of each set of said two sets of stoppers, and when each of said two wiper arm and rotatable blade assemblies is in its parked position, each of said two arms engages with a second stopper of each set of said two sets of stoppers; two springs, each resiliently biasing each of said two arms to engage with the second stopper of each set of said two sets of stoppers; mechanical linkage means for oscillating said two arms to engage with said first stoppers of said two sets of stoppers, respectively, against the biasing forces of said two springs when actuated; and a solenoid operable to actuate said mechanical linkage means.

* * * * *